United States Patent
Mudaliar

(10) Patent No.: US 11,341,495 B2
(45) Date of Patent: May 24, 2022

(54) ELECTRONIC METHOD FOR INSTANTLY CREATING AN ACCOUNT WITH A SERVICE PROVIDER DURING POINT OF SALE

(71) Applicant: PAYPAL, INC., San Jose, CA (US)

(72) Inventor: Rathakrishnan Mudaliar, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 1168 days.

(21) Appl. No.: 15/057,098

(22) Filed: Feb. 29, 2016

(65) Prior Publication Data

US 2017/0249638 A1 Aug. 31, 2017

(51) Int. Cl.
G06Q 20/40 (2012.01)
H04L 12/58 (2006.01)
G06Q 20/20 (2012.01)
G06Q 20/10 (2012.01)
G06Q 20/32 (2012.01)
G06Q 20/34 (2012.01)
H04L 51/046 (2022.01)

(52) U.S. Cl.
CPC ......... *G06Q 20/4012* (2013.01); *G06Q 20/10* (2013.01); *G06Q 20/204* (2013.01); *G06Q 20/3255* (2013.01); *G06Q 20/342* (2013.01); *H04L 51/046* (2013.01)

(58) Field of Classification Search
None
See application file for complete search history.

(56) References Cited

U.S. PATENT DOCUMENTS

| | | | | |
|---|---|---|---|---|
| 10,229,412 | B1* | 3/2019 | Henderson | G06Q 20/348 |
| 10,692,059 | B1* | 6/2020 | Thome | G06Q 20/3221 |
| 2003/0191711 | A1* | 10/2003 | Jamison | G06Q 20/102 |
| | | | | 705/40 |
| 2012/0239572 | A1* | 9/2012 | Wolfs | G06Q 20/20 |
| | | | | 705/44 |
| 2013/0165086 | A1* | 6/2013 | Doulton | H04M 3/53316 |
| | | | | 455/414.4 |
| 2013/0179351 | A1* | 7/2013 | Wallner | G06Q 20/382 |
| | | | | 705/71 |
| 2015/0154588 | A1* | 6/2015 | Purves | G06Q 30/0226 |
| | | | | 705/14.27 |
| 2015/0193765 | A1* | 7/2015 | Gadotti | G06Q 20/3274 |
| | | | | 705/39 |
| 2015/0254655 | A1* | 9/2015 | Bondesen | G06Q 20/1085 |
| | | | | 705/72 |
| 2016/0189123 | A1* | 6/2016 | Lucia Specogna | G06Q 20/405 |
| | | | | 705/43 |
| 2016/0321663 | A1* | 11/2016 | Batlle | G06Q 20/405 |

(Continued)

*Primary Examiner* — Jamie R Kucab
*Assistant Examiner* — Nicholas K Phan
(74) *Attorney, Agent, or Firm* — Haynes and Boone, LLP

(57) ABSTRACT

Systems and processes are provided for instantly creating a user account with a payment service provider at a point of sale. The system and processes may include a computerized payment processing system for receiving personally identifiable information from a payment card of a customer provided at a merchant terminal and creating a user account based on the personally identifiable information. A personal identification number (PIN) associated with the user account may be generated and electronically delivered to the customer via an electronic messaging system for verification.

20 Claims, 5 Drawing Sheets

(56) References Cited

U.S. PATENT DOCUMENTS

| | | | |
|---|---|---|---|
| 2016/0337332 A1* | 11/2016 | Ghosh | G06F 16/29 |
| 2017/0104807 A1* | 4/2017 | Braun | H04L 67/125 |
| 2017/0140379 A1* | 5/2017 | Deck | G06Q 20/34 |

* cited by examiner

ELECTRONIC METHOD FOR INSTANTLY CREATING AN ACCOUNT WITH A SERVICE PROVIDER DURING POINT OF SALE

BACKGROUND

The present application relates to instantly creating an account, and more specifically to electronically creating an account instantly with a service provider during a point of sale.

When consumers go shopping, various cashless payment methods are available to pay a merchant for their goods at a point of sale. One popular method is with a credit card. Credit cards are typically branded by a financial institution such as VISA®, MASTERCARD®, AMERICAN EXPRESS®, or DISCOVER®, to name a few. Merchants typically have agreements with some of the financial institutions which allow the merchant to accept the financial institution's credit cards (e.g., a VISA® branded credit card) from the customers as a form of payment. However, not all merchants have agreements with all existing financial institutions. As such, they do not necessarily accept all brands of credit cards. On the other hand, the customer may not have an account with the particular brand of the credit card in which the merchant accepts. Furthermore, the customer may not have on-hand other forms of payment, such as cash or check. If no other methods of payment are available, the customer is unable to make the purchase at the POS and the merchant misses out on the sales opportunity. Thus, providing other payment methods at a POS could potentially improve the merchants' revenue and the customer's shopping experience.

Figure 1:
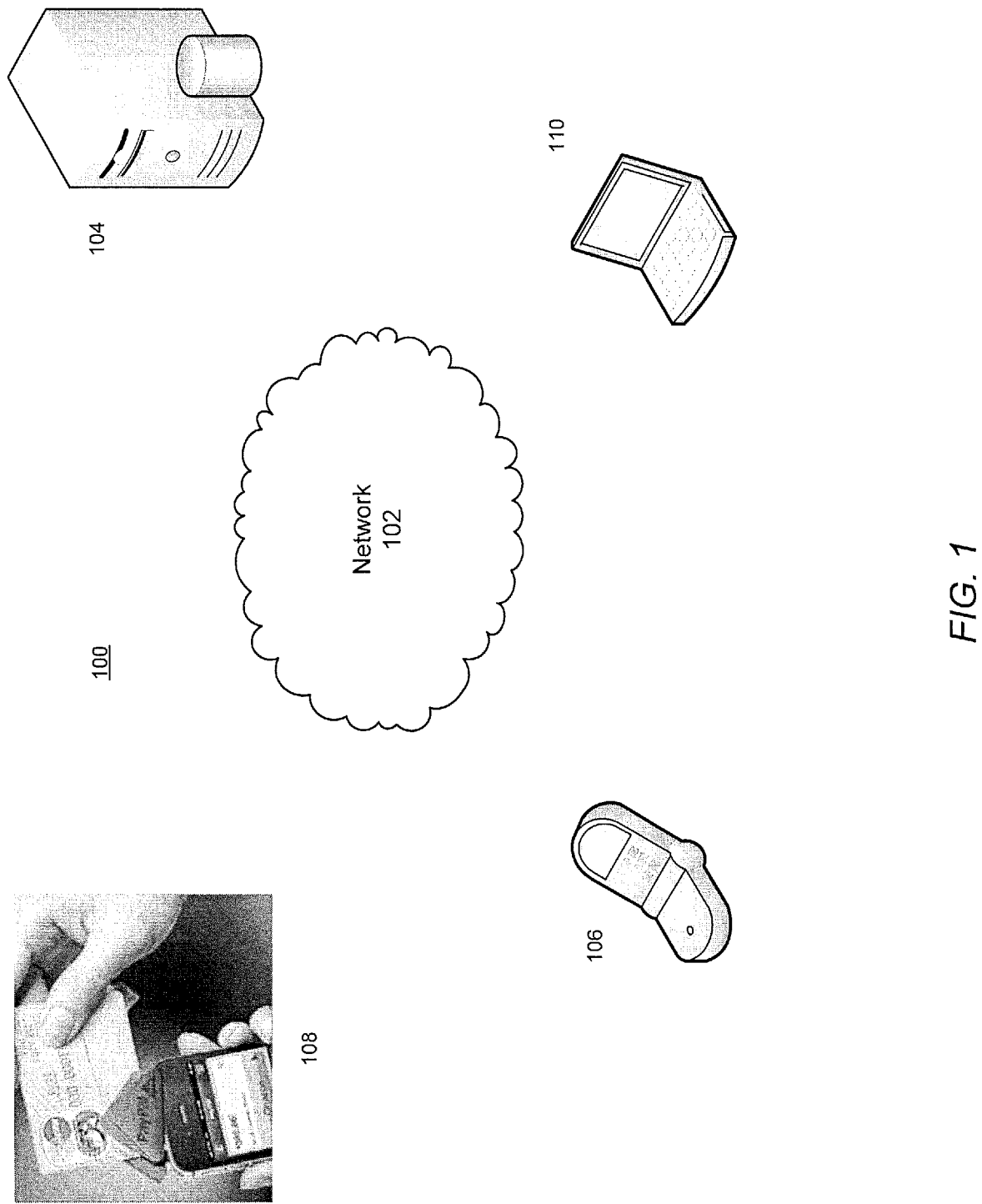
FIG. 1 is an exemplary block diagram of a payment service provider system suitable for implementing the described processes, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. In the drawings, the relative sizes of elements, layers, and regions may be exaggerated for clarity.

The present disclosure is directed to systems and methods for improving a point of sale (POS) experience to a customer while also benefiting merchants and service providers. One technique for improving the POS experience is to provide multiple payment methods to a customer for a POS transaction. In addition to payment methods such as credit cards, cash, and/or checks, some merchants may offer a payment option through a payment service provider such as, for example, PAYPAL®. A payment service provider may function as an intermediary that collects payment from one party and provides that payment to another party. For example, the payment service provider may collect funds from the customer and provide the funds to the merchant. In some instances, the customers may make a payment at a POS via the payment service provider without actually having established an account with the payment service provider. In other instances, the customers may be required to have established a user account with the payment service provider to execute payment transaction at a POS.

Consequently, if the customer has, for example, only a VISA® credit card, and the merchant does not accept VISA® credit cards, the customer may desire to make a payment with the merchant by utilizing a payment service provider. However, if the customer does not already have an account with the payment service provider, then the customer may not be able to make the payment. In such case, the customer may create an account by going home and using a computer terminal (e.g., a desktop computer), and then finally return to the merchant to complete the payment transaction through the payment service provider. However, it is a burden for the customer to go home, create an account, return to the merchant, and make the payment using the payment service provider.

Generally, an account with a payment service provider is created by a user, for example, from a home computer terminal, where the user may be required to enter the user's full name, address, phone number, email address, and funding information (e.g., one or more credit card number, or bank account numbers). Then, the user may be required to create a username and a password, and enter security information such as mother's maiden name. Furthermore, the user may have to access their email account to verify their email address and the user may also have to access their bank account to verify their bank account information. Additionally, the user may have to wait a few days for the bank account to be fully linked to their payment service provider account following verification. As such, the process of creating a user account can, in some instances, be burdensome and time consuming.

According to an embodiment of the present disclosure, the customer is able to create an account from the merchant terminal during the POS without the burden of using a computer terminal and going through the process of creating and verifying the account.

Credit cards, or more generally funding or payment cards, have a magnetic stripe and/or a chip, which contain an account number associated with the account as well as additional information about the user. For example, the magnetic stripe and/or the chip main contain personally identifiable information such as, the user's full name, address, phone numbers, email addresses, etc. Such information is typically embedded into the magnetic stripe and/or the chip by the credit card issuer when the credit card is issued to the user. Therefore, the credit card user may utilize the credit card to make a payment at a POS by swiping the credit card through a card reader provided by the merchant. Herein the present disclosure, the "card reader" may be interchangeably referred to as a "merchant terminal," and may be a magnetic card reader or a chip reader. Furthermore, the term "credit card" is intended to refer to any kind of a payment card, and is not limited to just a "credit card." For the purpose of this disclosure, the term "credit card" may be used interchangeable with the terms "charge card," "debit card," "gift card," or any other suitable funding instrument that can be used to make payments at a POS by providing the card to a card reader (e.g., swiping the card through the card reader).

According to an embodiment of the present disclosure, a server associated with the payment service provider ("server") can be configured to exploit the personally identifiable information to quickly create a user account without burdening the user as typically required when creating an account using traditional methods from a computer terminal. In more detail, the personally identifiable information (e.g., the customer's name, credit card account number and the credit limit of the credit card) that is embedded in the credit card is transmitted over a network connection to the server when the credit card is read by the merchant terminal at the POS. In turn, the sever can utilize this information to create a payment service provider account because, the name identifies the person (i.e., the customer) and the account number provides at least one source of funds for the payment service provider. Furthermore, the information can be considered legitimate because the information is obtained from embedded information stored on the credit card.

Accordingly, an account can be quickly created for a customer that does not have an account with the payment service provider, directly from the merchant terminal during the POS. Thus, if the customer's credit card is not a credit card that is accepted by the merchant, the customer now has a alternate option to make the payment because the merchant can now execute the payment transaction with the customer's newly created payment service provider account at the POS.

In some instances, the customer already has an account with the payment service provider. In this case, according to another embodiment of the present disclosure, the customer can provide a credit card at the merchant terminal during the POS and the customer's personally identifiable information is provided to the server over a network. Based on the personally identifiable information (e.g., name), the server may match the customer's identity with the customer's existing account with the payment service provider and authorize the merchant to execute a payment transaction with the customer's account. As such, a customer is provided an alternate option for making a payment with a credit card at the merchant terminal during a POS even when the merchant does not directly accept the customer's credit card. While embodiments of the present disclosure describe utilizing alternate payment methods when the merchant does not accept a customer's credit card, the embodiments are not necessarily limited thereto. Instead, the customer may merely desire to use the alternate payment method even though the merchant may directly accept the customer's credit card.

FIG. 1 is a block diagram illustrating an example arrangement of a payment service provider server 104 ("server") connected to a network 102, and the relationship between the server 104, a computer terminal 110, a merchant terminal 108, and a mobile device 106, according to various embodiment of the present disclosure. By way of example and not of limitation, the mobile device 106 may be any portable electronic device that is capable of receiving electronic messages (e.g., SMS/MMS text messages and/or emails) such as, a smartphone, a cell phone capable of receiving SMS text messages, a tablet, or a wearable mobile device. The mobile device 106 may be connected to a cellular network (e.g., 4G LTE network) and/or the Internet over a wired or wireless connection (e.g., Wi-Fi network).

In some embodiments, the merchant terminal 108 may be a mobile card reader such as those that attach to smartphones. In some embodiments, the merchant terminal 108 may be a card reader that is attached to or built-in to a cash register or a computer terminal. Yet in other embodiments, the merchant terminal 108 may be a stand-alone credit card reader.

In some embodiments, the server 104 is associated with the payment service provider such as PAYPAL® and may be configured to host the payment service provider's service, as well as process and store user account information of its customers. A database (210 in FIG. 2) of the server 104 stores the user account information, and together with the hardware processor, executes the payment service provider's operations. Thus, transactions that are performed at the merchant terminal 108 communicate with the server 104 over the network 102.

The computer terminal 110 may be any computing device such as, for example, a desktop computer, a laptop computer, or a tablet device, that is connected to the network 102 (e.g., the Internet). Thus, a customer may utilize the computer terminal 110 to access a user account located on the server 104, or to create a new account with the payment service provider.

Figure 2:
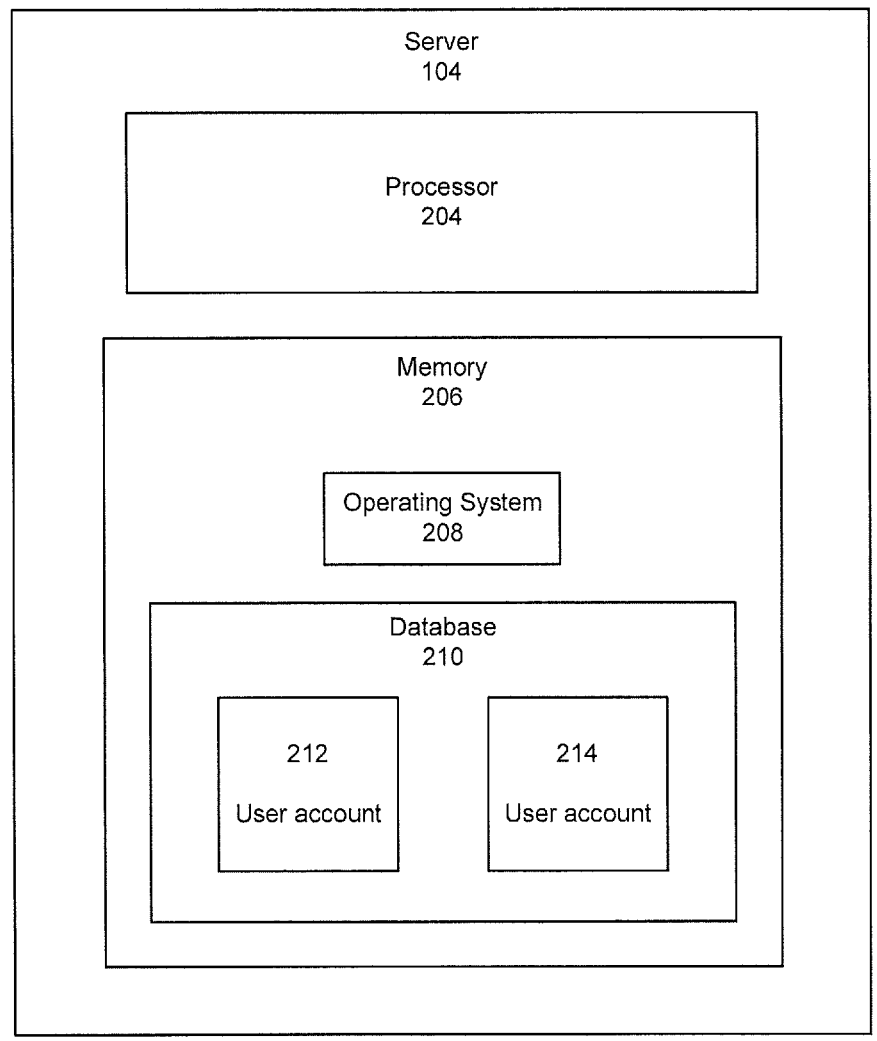
FIG. 2 is an exemplary block diagram of the server illustrated in FIG. 1, according to an embodiment.

FIG. 2 is an exemplary block diagram of the server 104 illustrated in FIG. 1, shown in more detail. In some embodiments, the server 104 includes a hardware processor 204, a non-transitory memory 206 and a database 210.

The hardware processor 204 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein and discussed in more detail below. The hardware processor 204 may also be implemented as a combination of computing devices, e.g., a combination of a DSP and a microprocessor, a plurality of microprocessors, one or more microprocessors in conjunction with a DSP core, or any other such configuration. The hardware processor 204 may be a single processor or multiple processors, where each processor may have one or more processing cores capable of parallel and/or sequential operation.

The non-transitory memory 206 may include a cache memory (e.g., a cache memory of the processor 206), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the non-transitory memory 206 includes a non-transitory computer-readable medium.

The non-transitory memory 206 may store instructions that, when executed by the hardware processor 204, cause the hardware processor 204 or a system that includes the hardware processor 204 to perform the operations described herein in connection with embodiments of the present disclosure. Instructions may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements. In some embodiments, the memory 206 may include an operating system 208, such as WINDOWS® or LINUX® operating systems. Yet in some embodiments, the non-transitory memory 206 may include a database 210 for storing information (e.g., name, address, phone number, etc.) for the user accounts 212, 214. FIG. 2 shows that the database 210 stores information that pertains to the first user 212, and information that pertains to the second user 214. The database 210 may also store other information that may not be necessary for the understanding of the embodiments of the present disclosure, and are thus omitted.

A user may access the user account 212 stored in the database 210 on the server 104 by utilizing, for example, a computer terminal 110 connected to the Internet. The computer terminal 110 may have applications such as a web browser (e.g., CHROME® or INTERNET EXPLORER®) and the user may visit the website associated with the payment service provider and enter his username and password. In doing so, the user invokes the hardware processor 204 of the server 104 to give the user access to his account 212.

Figure 3:
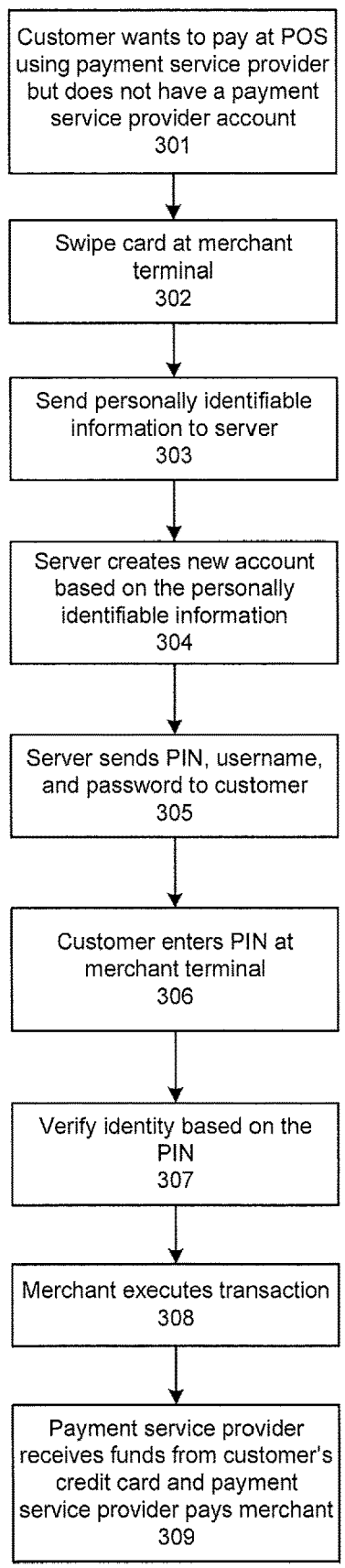
FIG. 3 is a flowchart of an exemplary process describing a method for a customer to create an account with a payment service provider at a point of sale from a merchant terminal, according to an embodiment.

FIG. 3 is an exemplary flowchart for describing a method for creating an account with a payment service provider from a merchant terminal at a POS. The term "customer" refers to a customer of a merchant and the term "user" refers to a person that uses the credit card or the payment service provider, who may also be the merchant's customer. Thus, herein the present disclosure, the terms "customer" and the term "user" may be used interchangeably. The term "merchant" refers to a person or an entity that receives a payment from the customer, and is therefore not necessarily limited to a person or entity that is selling products. Instead, it can be any person or entity that receives a payment as described throughout the present disclosure.

According to an embodiment of the present disclosure, a customer desires to make a payment to a merchant at a POS using a particular credit or funding card that is not accepted by the merchant. In this embodiment, the customer may still use the credit card at the POS, but instead have payment provided to the merchant through an account created for the user by a payment service provider, where funding for the account or purchase may be through the credit card read at the POS. Thus, the customer has a credit card but this particular credit card is not accepted by the merchant and/or the customer does not want to want to make a payment directly with the merchant using this particular credit card (301). Furthermore, it is assumed that the merchant has a merchant terminal 108 such as a credit card reader which can be used to swipe or scan the credit card, connected with the payment service provider over a network. In some embodiments, the merchant may have multiple credit card readers where one credit card reader is used to swipe the credit cards that are accepted by the merchant and a second credit card reader is used for swiping the credit cards when the user desires to use the payment service provider. For example, the credit card reader that is used for the payment service provider may be computer terminal with a card reader connected to it, and the computer may be running an application that is built using a software development kit (SDK) provided by the payment service provider such that the card reader will to transmit information from the card reader to the payment service provider server.

According to the embodiment, the customer swipes a credit card in a case where the customer is attempting to make a payment with the credit card or desires to make a payment using the payment service provider, at the merchant terminal (302). Once the credit card is determined to not be acceptable for use with the merchant, the merchant terminal transmits the personally identifiable information embedded on the credit card to the server (303). Note that this may be done automatically or the customer may be asked whether the customer wishes to create a new account (assuming the customer does not already have an account) to enable payment while still at the merchant terminal. For example, the store clerk may ask the customer, and if the customer agrees, the clerk may enter an acceptance through the merchant terminal. In another example, the customer may receive a notification through the customer's mobile phone, in which case the credit card would contain data or information that enables the payment service provider to send a text or other message to the customer. The customer may then agree, such as by selecting a button, replying to a text, or other suitable means to convey the response to the payment service provider. The personally identifiable information may include, for example, the name, address, email address and phone number of the credit card holder, account number of the credit card, and the credit limit of the credit card, but is not limited thereto and may include more or less information. Furthermore, the customer may swipe the credit card at the merchant terminal or the merchant may swipe the credit card on behalf of the customer.

The server receives the personally identifiable information from the credit card and determines that the customer does not have a user account established with the payment service provider, and the server automatically creates a new user account on the server (304). In some embodiments, the account is created using only the information obtained from the credit card to create an account. Thus, a complete account may be necessarily be set up but an account that is functional for the purpose of making a payment transaction from a merchant terminal is created. For example, the customer's name, credit card account number and the credit limit may be sufficient to minimally establish an account. In other instances, more information may be desired or needed to create an account. In some embodiments, the merchant may request to see a photo identification (ID) from the customer before swiping the credit card at the merchant terminal in order to avoid or minimize fraudulent use because the merchant can verify that the name that is printed on the credit card matches the name on the customer's photo ID.

In some embodiments, the merchant or the customer can press a button (or tap on an icon) at the merchant terminal to indicate to the server that the user does not currently have an account with the payment service provider and that a new account should be created based on the transmitted personally identifiable information. That is, when the button is pressed, the merchant terminal sends a request to the server that instructs the serve to create a new account.

In some embodiments, when the server creates the new account, the server generates a personal identification number (PIN), a username, and a password, associated with the account. According to an embodiment, the PIN is sent to the customer over an electronic messaging system (305) such as an SMS text message or a voice message or call to the customer's mobile phone number, or an email to the customer's email address. The customer is then requested to enter the PIN at the merchant terminal to verify that the customer is the rightful owner of the credit card, agreed to create an account, and complete the transaction (306). In some embodiments, the mobile phone number and/or the email address are obtained as part of the personally identifiable information embedded on the credit card. Thus, if the credit card was a stolen credit card and a thief attempted to create a new account with the stolen credit card at the merchant terminal, then the PIN would be sent from the server to the rightful owner of the credit card instead of to the thief's phone number or email address. Thus, the thief would not be able to verify ownership of the newly created account, and would not be able to make a payment transaction at the POS. In some embodiments, the mobile phone number and/or the email address are not obtained as part of the personally identifiable information. In such cases, these details may be collected from the user directly after verifying the user's identity, for example, by the merchant personally checking the ID against the card.

In some embodiments, the username and the password for the newly created account are also sent to the customer over an electronic messaging system (305), and the username and password can be utilized by the customer at a later time to log in to the newly created account to make changes to the account. For example, the customer was at a store when the account was created from the merchant terminal but the customer can later log in to the account from a home computer terminal to fully complete the user profile, add additional funding sources, change the password, etc.

When the customer enters the PIN at the merchant terminal, the PIN is transmitted over the network to the server and the PIN is compared with the PIN that is stored on the server. If the PINs match, then the authenticity of the account is confirmed and the server authorizes the merchant to execute a payment transaction (307). That is, the server sends an indication to the merchant terminal (e.g., an authorization message or turns on an indicator light) that authorizes the merchant to request a payment from the customer through the customer's account with the payment service provider (308). Once the payment transaction is executed, the merchant will receive a payment from the payment service provider and the payment service provider will receive a payment from the customer. According to the described embodiment, the payment service provider will receive a payment from the customer's credit card because the credit card is initially designated as the funding source for the newly created account (409). As such, the user is able to instantly create a new account with the payment service provider from the merchant terminal and make a payment transaction at a POS.

Figure 4:
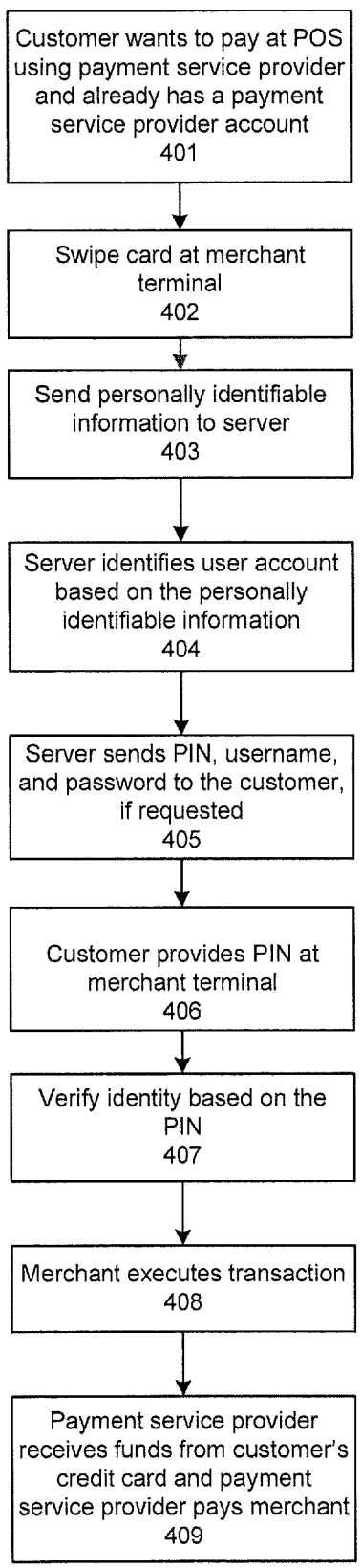
FIG. 4 is a flowchart of an exemplary process describing a method for executing a payment transaction at a point of sale from a merchant terminal, according to another embodiment.

FIG. 4 is an exemplary flowchart for describing a method for a customer to execute a payment transaction with a merchant at a POS according to an embodiment of the present disclosure.

Different from the embodiment described with reference to FIG. 3, a customer desiring to make a payment transaction at a POS already has an account established with the payment service provider according to the embodiment described with reference to FIG. 4.

According to the embodiment, the customer desires to make a payment to a merchant at a POS through a payment service provider and the customer already has an account with the payment service provider. Furthermore, the customer's account with the payment service provider is associated with at least one funding source, such as a credit card account. Additionally, the customer has a credit card on-hand, but either the merchant does not accept this particular credit card, or the customer does not want to want to make a payment directly with the merchant using this particular credit card (401). In other embodiments, the customer, without any specific desire, simply has the credit card read, which either defaults to payment with the credit card (assuming the merchant accepts the specific credit card) or processes the payment through the account of the customer with the payment service provider, as discussed below. The merchant has a merchant terminal 108 such as a credit card reader which can be used to swipe or scan the credit card, and the credit card reader is connected to a server associated with the payment service provider over a network.

According to the embodiment, the customer or the merchant swipes the credit card using the merchant terminal (402) at a POS, which transmits the personally identifiable information embedded on the credit card to the payment service provider server (403).

The server receives the personally identifiable information that was embedded in the credit card and checks the database of the server to determine whether or not the customer has an account with the payment service provider. This embodiment describes a case where the customer already has an account and thus the server determines that the customer has an account stored in the database (404).

In some embodiments, in order to verify that the customer is the rightful owner or an authorized user of the account, the customer may be requested to enter a PIN that is already registered with the account (and already known by the customer). Yet in some embodiments, the server may generate a new PIN associated with the account in case the user cannot remember his PIN. In such case, the server may send the PIN to the customer over an electronic messaging system (405) such as an SMS text message to the customer's mobile phone number (i.e., an electronic address), or an email to the customer's email address. The customer is then requested to enter the PIN at the merchant terminal to verify that the customer is the rightful owner of the credit card (406) and also the rightful owner of the existing account with the payment service provider. In some embodiments, the mobile phone number and/or the email address are obtained as part of the personally identifiable information embedded on the credit card. Thus, if the credit card was stolen and a thief attempted to make a POS payment transaction using the customer's payment service provider account and asks to regenerate a new PIN, the PIN would be sent to the rightful owner of the credit card instead of the thief's phone number or email address. Thus, the thief would not be able to verify ownership of the account and would be denied from making a payment transaction from this account.

According to the embodiment, when the customer enters the PIN at the merchant terminal, the PIN is transmitted over the network to the payment service provider server and compared with the PIN that is stored in the database of the server. If the PINs match, then the authenticity of the account is confirmed and the server authorizes the merchant to execute a payment transaction (407). That is, the server sends an indication to the merchant terminal (e.g., an authorization message or turns on an indicator light) that authorizes the merchant to receive a payment from the customer through the customer's account with the payment service provider (408). Once the payment transaction is executed, the merchant will receive a payment from the payment service provider and the payment service provider will receive a payment from the customer (409).

In some embodiments, the customer may execute the payment transaction using the payment service provider account with the funding source that is already assigned as the default funding source for that account. Alternatively, in some embodiments, the customer may change the funding source associated with the payment service provider's account before executing the payment transaction. That is, for example, if the default funding source is a credit card different from the credit card that was swiped at the merchant terminal, the customer may change this default funding source to the credit card that was swiped because the server already has the credit card account number.

Figure 5:
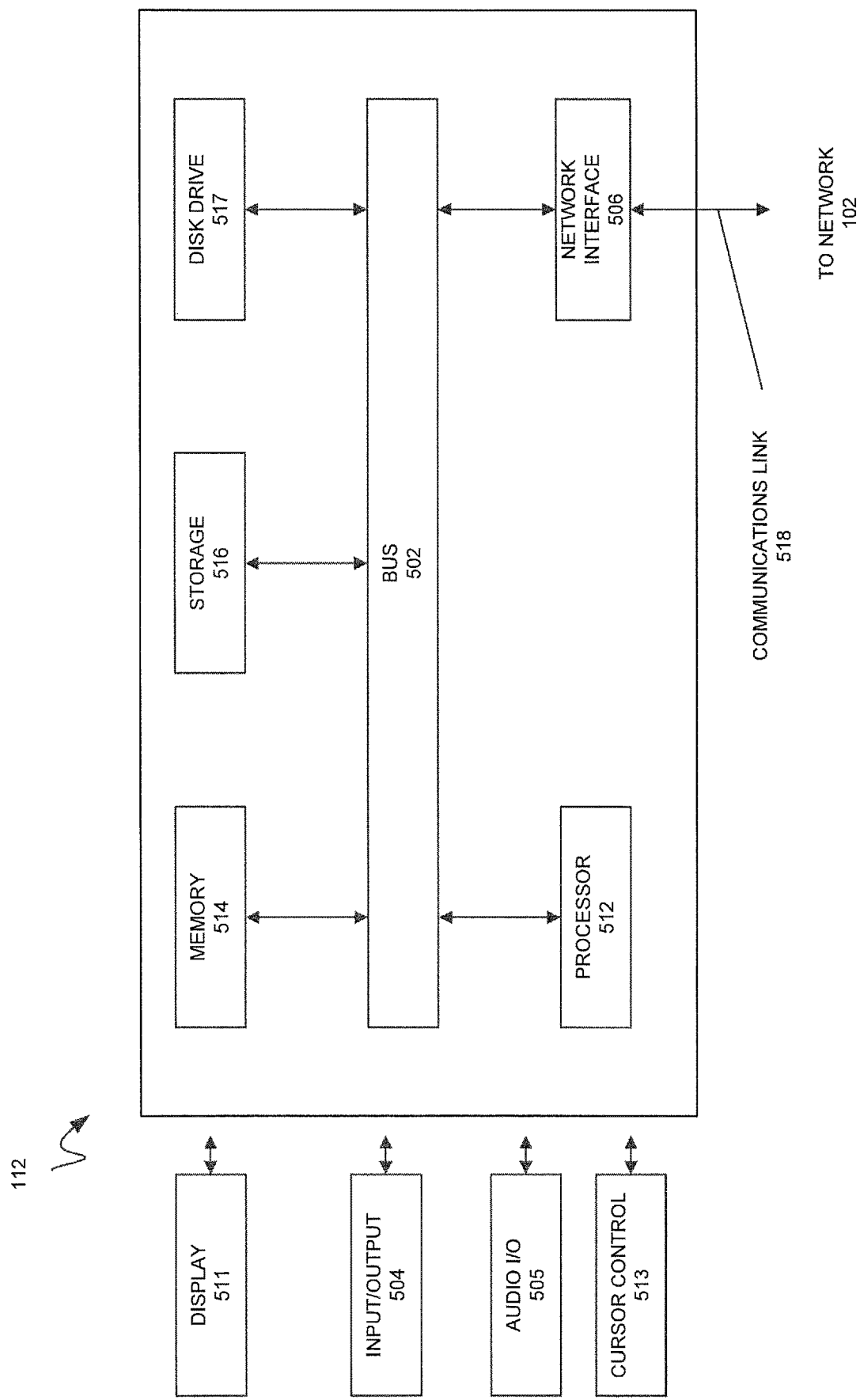
FIG. 5 is an exemplary block diagram of a mobile terminal illustrated in FIG. 1, according to an embodiment.

FIG. 5 illustrates an exemplary embodiment for implementing the mobile terminal 108 as described throughout the present disclosure. In accordance with various embodiments of the present disclosure, mobile terminal 108 may be a card reader device coupled with a computer terminal configured to run a software application such that the card reader communicates with the computer terminal and the computer terminal is connected to a network.

The mobile terminal 108 includes a bus 502 or other communication mechanism for communicating information, which interconnects subsystems and components, such as a processing component 512 (e.g., processor, micro-controller, digital signal processor (DSP), etc.), a system memory component 514 (e.g., RAM), a static storage component 516 (e.g., ROM), a disk drive component 517 (e.g., magnetic or optical), a network interface component 506 (e.g., modem or Ethernet card), a display component 511 (e.g., LCD or OLED), an input component 504 (e.g., keyboard, keypad, or virtual keyboard), and a cursor control component 513 (e.g., mouse, pointer, or trackball). In one implementation, the disk drive component 517 may comprise a database having one or more disk drive components.

In accordance with embodiments of the present disclosure, the mobile terminal 108 performs specific operations by the processor 512 executing one or more sequences of instructions contained in the memory component 514, such as described herein with respect to the mobile terminal 108. In some embodiments, the sequences of instructions may be implemented by a software development kit (SDK). Such instructions may be read into the system memory component 514 from another computer readable medium, such as the static storage component 516 or the disk drive component 517. In other embodiments, hard-wired circuitry may be used in place of or in combination with software instructions to implement the present disclosure.

Logic may be encoded in a computer readable medium, which may refer to any medium that participates in providing instructions to the processor 512 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 517, volatile media includes dynamic memory, such as the system memory component 514, and transmission media includes coaxial cables, copper wire, and fiber optics, including wires that comprise the bus 502. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the mobile terminal 108. In various other embodiments of the present disclosure, a plurality of the mobile terminals 108 coupled by a communication link 518 to the network 102 (e.g., such as a LAN, WLAN, PTSN, and/or various other wired or wireless networks, including telecommunications, mobile, and cellular phone networks) may perform instruction sequences to practice the present disclosure in coordination with one another.

The mobile terminal 108 may transmit and receive messages, data, information and instructions, including one or more programs (i.e., application code) through the communication link 518 and the network interface component 506. The network interface component 506 may include an antenna, either separate or integrated, to enable transmission and reception via the communication link 518. Received program code may be executed by processor 512 as received and/or stored in disk drive component 517 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It will be understood that, although the terms "first," "second," "third," etc., may be used herein to describe various elements, regions, and/or sections, these elements, regions, and/or sections should not be limited by these terms. These terms are used to distinguish one element, region, or section from another element, region, or section. Thus, a first element, region, or section described below could be termed a second element, region, or section, without departing from the spirit and scope of the present invention.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention pertains. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims and their equivalents.

The invention claimed is:

1. A computerized transaction processing system of a third-party payment provider, comprising:
   a non-transitory memory storing instructions; and
   one or more hardware processors coupled to the non-transitory memory and configured to read the instructions from the non-transitory memory to cause the computerized transaction processing system to perform operations comprising:
      receiving, by the one or more hardware processors of the third-party payment provider and from a card reader coupled to a merchant terminal of a merchant, embedded card data of a payment card of a customer, the merchant being different from the third-party payment provider;
      determining that the payment card provided to the card reader is not accepted by the merchant via the merchant terminal;
      determining, based on the received embedded card data, that the customer does not have a user account with the third-party payment provider;
      determining, from the embedded card data, a phone number for a mobile device of the customer;
      transmitting, to the mobile device of the customer using the phone number, a confirmation request to create the user account for the customer using the payment card and the phone number for the mobile device of the customer, the user account enabling transaction processing using an intermediary transaction service provider associated with the computerized transaction processing system;
      receiving a response to the confirmation request from the mobile device;
      authenticating the customer based on personally identifiable information retrieved from the embedded card data and the response to the confirmation request;
      creating the user account based on the personally identifiable information and storing the user account;
      generating a personal identification number (PIN) associated with the user account, the PIN enabling a use of the user account instead of the payment card based on a reading of the embedded card data from the payment card, and the use comprising a payment of a transaction from the user account;
      electronically delivering, via a message using the phone number for the mobile device, the PIN to the customer;
      verifying the customer is an owner of the payment card by requesting the customer to provide the PIN at the merchant terminal;
      setting a default funding source for the user account to the payment card based on the verifying; and
      processing the transaction with the merchant terminal using the user account in place of the payment card, wherein the transaction is processed using funds retrieved from the payment card and paid using the user account.

2. The computerized transaction processing system of claim 1, wherein prior to the processing the transaction, the operations further comprise:
   receiving a confirmed verification of the transaction.

3. The computerized transaction processing system of claim 2, wherein the operations further comprise:
   receiving an additional payment card for the user account, wherein the user account is funded for the transaction with the additional payment card.

4. The computerized transaction processing system of claim 1, wherein the operations further comprise:
   generating a username and a password associated with the user account, the username and password being electronically delivered to the mobile device.

5. The computerized transaction processing system of claim 1, wherein the message is transmitted using a short message service (SMS).

6. The computerized transaction processing system of claim 1, wherein the payment card comprises one of a credit card, a debit card, a charge card, or a gift card.

7. The computerized transaction processing system of claim 1, wherein the personally identifiable information comprises a name, an account number, a credit limit, or an email address.

8. The computerized transaction processing system of claim 1, wherein the PIN is randomly generated.

9. An electronic method, comprising:
   reading, using a card reader coupled to a merchant terminal at a point of sale (POS) of a merchant, embedded card data from a data storage component of a payment card of a customer, wherein the embedded card data comprises personally identifiable information, the card reader being associated with a payment service provider that is different from the merchant;

determining that the payment card provided to the card reader is not accepted by the merchant via the merchant terminal;

receiving, by a server associated with the payment service provider, the personally identifiable information obtained from the payment card;

determining, based on the embedded card data, that the customer does not have a user account with the payment service provider;

determining, from the embedded card data, a phone number for a mobile device of the customer;

transmitting, to the mobile device of the customer using the phone number, to display a confirmation request to create the user account for the customer using the payment card and the phone number for the mobile device of the customer, the user account enabling transaction processing using the payment service provider as an intermediary for a transaction processor of the payment card;

authenticating the customer with the payment service provider based on the personally identifiable information and a response to the confirmation request received by the payment service provider;

creating the user account based on the personally identifiable information and storing the created user account;

electronically delivering, via a message using the phone number for the mobile device, a personal identification number (PIN} for the user account to the customer;

setting a default funding source for the user account to the payment card based on the determining that the payment card is not accepted by the merchant and the creating the user account; and processing a POS transaction received from the merchant terminal via the user account in place of the payment card, wherein the POS transaction is processed using funds retrieved from the payment card and paid using the user account.

10. The method of claim 9, further comprising:
generating, by the server in response to the user account being created, the PIN for the user account.

11. The method of claim 9, wherein the message is transmitted using a short message service (SMS).

12. The method of claim 9, the payment card comprises one of a credit card, a debit card, a charge card, or a gift card.

13. The method of claim 10, wherein the personally identifiable information comprises at least one of a name, an account number, a credit limit, or an email address.

14. The method of claim 10, further comprising:
before the processing of the POS transaction, verifying an identity of the customer based on the PIN.

15. A non-transitory machine-readable medium having stored thereon machine-readable instructions executable to cause a machine to perform operations comprising:

receiving, by a third-party payment provider and from a card reader coupled to a merchant terminal of a merchant, embedded card data of a payment card of a customer, the merchant being different from the third-party payment provider;

determining that the payment card provided to the card reader is not accepted by the merchant via the merchant terminal;

determining, based on the embedded card data, that the customer does not have a user account with the third-party payment provider;

determining, from the embedded card data, a phone number for a mobile device of the customer;

transmitting, to the mobile device of the customer using the phone number, a confirmation request to use the user account for the customer using the payment card and the phone number for the mobile device of the customer, the user account enabling transaction processing using an intermediary transaction service provider;

receiving a response to the confirmation request from the mobile device;

authenticating the customer based on personally identifiable information retrieved from the embedded card data and the response to the confirmation request;

identifying the user account corresponding to the customer stored in a database of a server, based on the personally identifiable information;

electronically delivering, via a message using the phone number for the mobile device, a personal identification number (PIN) for the user account to the customer, the PIN enabling a use of the identified user account instead of the payment card based on a reading of the embedded card data from the payment card, wherein the use comprises a payment of a transaction from the identified user account;

verifying that the identified user account belongs to the customer by invoking the customer to provide the PIN at the merchant terminal;

changing a default funding source for the user account to the payment card based on the determining that the payment card is not accepted by the merchant and the identifying the user account; and processing the transaction between the customer and the merchant via the merchant terminal in place of the payment card, wherein the transaction is processed using funds retrieved from the payment card and paid using the user account.

16. The non-transitory machine-readable medium of claim 15, wherein the operations further comprise:
receiving a request from the customer to generate the PIN; and
generating the PIN in response to the request from the customer.

17. The non-transitory machine-readable medium of claim 15, wherein the PIN is retrieved from the database in response to identifying the user account, the PIN being pre-set by the customer and stored in the database when the user account was created.

18. The non-transitory machine-readable medium of claim 15, wherein prior to the processing the transaction, the operations further comprise:
receiving a positive verification of the transaction.

19. The non-transitory machine-readable medium of claim 18, wherein in response to the changing the default funding source the operations further comprise:
determining an additional payment card associated with the identified user account; and
switching from the additional payment card to the payment card for retrieving the funds for the transaction.

20. The non-transitory machine-readable medium of claim 16, wherein the message is transmitted using a short message service (SMS), and wherein the payment card comprises one of a credit card, a debit card, a charge card, or a gift card.

* * * * *